US011536356B2

United States Patent
Yamaguchi et al.

(10) Patent No.: US 11,536,356 B2
(45) Date of Patent: Dec. 27, 2022

(54) WORK VEHICLE

(71) Applicant: KUBOTA CORPORATION, Osaka (JP)

(72) Inventors: Tetsuo Yamaguchi, Osaka (JP); Ryoma Iwase, Osaka (JP); Komei Yamawaki, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 17/514,284

(22) Filed: Oct. 29, 2021

(65) Prior Publication Data

US 2022/0196128 A1 Jun. 23, 2022

(30) Foreign Application Priority Data

Dec. 17, 2020 (JP) .............................. JP2020-209180

(51) Int. Cl.
*F16H 61/00* (2006.01)
*F16H 47/04* (2006.01)
*F16H 61/431* (2010.01)

(52) U.S. Cl.
CPC ........... *F16H 47/04* (2013.01); *F16H 61/431* (2013.01); *F16H 2061/0034* (2013.01)

(58) Field of Classification Search
CPC .................. F16H 47/04; F16H 61/431; F16H 2061/0034; F16H 59/44; F16H 59/48; F16H 59/54; F16H 2059/6861; F16H 61/42; F16H 61/47; F16H 2037/0886; F16H 2312/16; B60Y 2200/221
See application file for complete search history.

(56) References Cited

U.S. PATENT DOCUMENTS

| | | | |
|---|---|---|---|
| 2005/0059521 A1* | 3/2005 | Funato | B60W 30/18045 475/73 |
| 2011/0048829 A1 | 3/2011 | Matsumoto et al. | |
| 2015/0176705 A1* | 6/2015 | Dix | F16H 61/431 701/50 |
| 2018/0265053 A1 | 9/2018 | Fujiki et al. | |

FOREIGN PATENT DOCUMENTS

| | | | |
|---|---|---|---|
| CN | 205292616 U | * | 6/2016 |
| JP | 11-311329 A | | 11/1999 |
| JP | 2017-58000 A | | 3/2017 |

OTHER PUBLICATIONS

Extended European Search Report issued in corresponding Patent Application No. 21206085.9 dated Apr. 20, 2022.

* cited by examiner

*Primary Examiner* — Justin Holmes
(74) *Attorney, Agent, or Firm* — Greenblum & Bernstein, P.L.C.

(57) ABSTRACT

A work vehicle includes an engine, a speed changing apparatus that includes a hydrostatic stepless speed changing mechanism and is configured to subject motive power transmitted from the engine to speed changing and output the motive power, a travelling apparatus configured to travel on the motive power received from the speed changing apparatus, a speed detector configured to detect a speed of the travelling apparatus, a pressure detector configured to detect a hydraulic pressure in a closed circuit of the hydrostatic stepless speed changing mechanism, and a controller.

6 Claims, 4 Drawing Sheets

WORK VEHICLE

CROSS REFERENCE TO RELATED APPLICATIONS

This application claims the benefit of priority to Japanese Patent Application No. 2020-209180 filed on Dec. 17, 2020. The entire contents of this application are hereby incorporated herein by reference.

BACKGROUND OF THE INVENTION

1. Field of the Invention

The present invention relates to a work vehicle.

2. Description of the Related Art

For example, a work vehicle disclosed in JP 2017-58000A includes a speed changing apparatus (referred to as a "hydromechanical stepless transmission" in the document) that includes a hydrostatic stepless speed changing mechanism (referred to as a "first stepless transmission" in the document). A swashplate angle of the hydrostatic stepless speed changing mechanism is controlled when the work vehicle is being decelerated. Incidentally, when the work vehicle is being decelerated, a hydraulic pressure in a closed circuit of the hydrostatic stepless speed changing mechanism tends to increase. When the hydraulic pressure in the closed circuit increases, the temperature of hydraulic oil tends to be higher than an appropriate temperature, and there is a risk that the efficiency of motive power transmission performed by the hydrostatic stepless speed changing mechanism will be affected. Therefore, it is desirable to employ a configuration in which the swashplate angle of the hydrostatic stepless speed changing mechanism is appropriately controlled based on the hydraulic pressure in the closed circuit of the hydrostatic stepless speed changing mechanism.

SUMMARY OF THE INVENTION

Preferred embodiments of the present invention control the swashplate angle of a hydrostatic stepless speed changing mechanism within an appropriate range of load, in a work vehicle.

A work vehicle according to a preferred embodiment of the present invention including:
an engine;
a speed changing apparatus including a hydrostatic stepless speed changing mechanism and configured to subject motive power from the engine to speed changing and output the motive power;
a travelling apparatus configured to travel on the motive power received from the speed changing apparatus;
a speed detector configured to detect a speed of the travelling apparatus;
a pressure detector configured to detect a hydraulic pressure in a closed circuit of the hydrostatic stepless speed changing mechanism; and
a controller configured or programmed to:
determine, by means of a determination module and based on the speed and the hydraulic pressure, whether the hydrostatic stepless speed changing mechanism has a swashplate angle suitable for stopping the work vehicle; and
change the swashplate angle by means of an angle control module, based on a result of the determination by the determination module.

According to the preferred embodiment of the present invention, the hydraulic pressure in the closed circuit is detected by the pressure detector, and the determination module performs determination processing based on the speed and the hydraulic pressure. Accordingly, the swashplate angle control module is capable of performing control for changing the swashplate angle based on appropriate control of the hydraulic pressure. Therefore, the efficiency of motive power transmission performed by the hydrostatic stepless speed changing mechanism is kept favorable even in an operation environment in which the hydraulic pressure tends to increase. Thus, the swashplate angle of the hydrostatic stepless speed changing mechanism is controlled within an appropriate range of load.

With a preferred embodiment of the present invention, in the work vehicle,
the controller is configured or programmed to
determine, by means of the determination module, whether the swashplate angle is an angle at which a rotation speed of the motive power outputted from the speed changing apparatus is not greater than a predetermined rotation speed.

According to this configuration, the rotation speed of the motive power outputted from the speed changing apparatus becomes low, and accordingly, a load on the hydrostatic stepless speed changing mechanism is reduced.

With a preferred embodiment of the present invention, in the work vehicle,
the speed changing apparatus is a hydromechanical speed changing apparatus including a planetary gear mechanism on an output side of the hydrostatic stepless speed changing mechanism.

The planetary gear mechanism is precisely configured, but according to this configuration, an excessive load is unlikely to be applied to the planetary gear mechanism because a load on the hydrostatic stepless speed changing mechanism is reduced.

With a preferred embodiment of the present invention, in the work vehicle,
the controller is configured or programmed to
change the swashplate angle by means of the angle control module in a case where the speed is not greater than a predetermined value and the hydraulic pressure is higher than or equal to a predetermined value.

This configuration reduces a risk that a load will be unnecessarily applied to the hydrostatic stepless speed changing mechanism when the speed is low.

With a preferred embodiment of the present invention, the work vehicle further including
a braking apparatus configured to brake the travelling apparatus,
wherein the controller is configured or programmed to
change the swashplate angle by means of the angle control module when the travelling apparatus is being braked.

The hydraulic pressure in the closed circuit tends to increase particularly in a state where the travelling apparatus is being braked by the braking apparatus, and therefore, control of the hydraulic pressure is important particularly when the travelling apparatus is being braked. With this configuration, the swashplate angle is appropriately controlled when control of the hydraulic pressure is particularly important, such as when sudden braking is applied.

With a preferred embodiment of the present invention, in the work vehicle, the closed circuit of the hydrostatic stepless speed changing mechanism includes:
  a hydraulic pump drivable by the motive power from the engine;
  a hydraulic motor drivable by hydraulic oil from the hydraulic pump; and
  a hydraulic path through which the hydraulic oil circulates between the hydraulic pump and the hydraulic motor, and
the pressure detector is disposed on the hydraulic path.

With this configuration, the hydraulic pressure of the hydraulic oil in the closed circuit is reliably detected.

The above and other elements, features, steps, characteristics and advantages of the present invention will become more apparent from the following detailed description of the preferred embodiments with reference to the attached drawings.

DETAILED DESCRIPTION OF PREFERRED EMBODIMENTS

The following describes preferred embodiments as examples of the present invention, based on the drawings.

Figure 1:
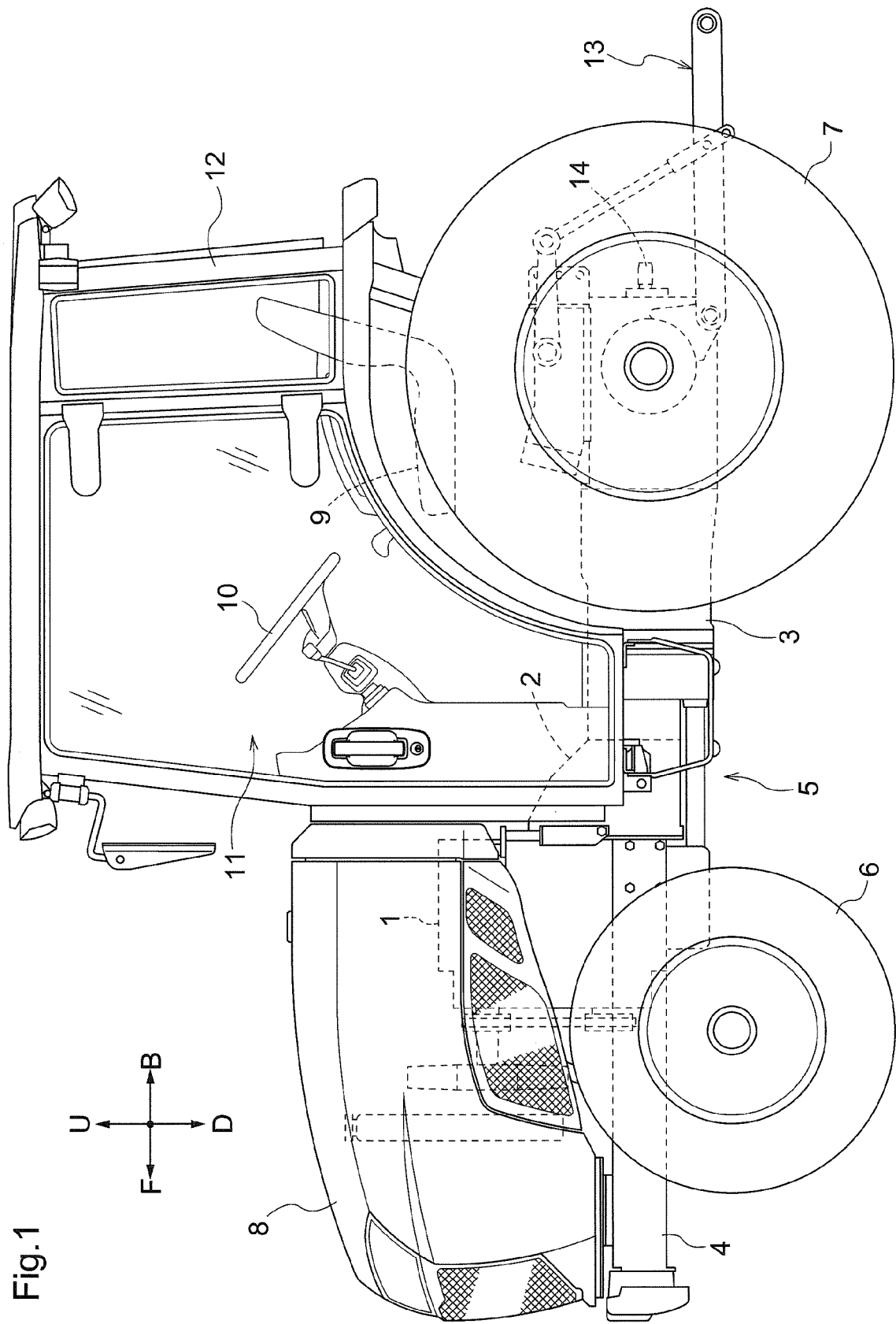
FIG. 1 is a left side view showing the entirety of a tractor.

In the following description, with respect to a travel vehicle body of a tractor, the direction indicated by an arrow "F" shown in FIG. 1 is the front side of the vehicle body, the direction indicated by an arrow "B" is the back side of the vehicle body, the direction indicated by an arrow "U" is the upper side of the vehicle body, the direction indicated by an arrow "D" is the lower side of the vehicle body, the front side of the sheet of FIG. 1 is the left side of the vehicle body, and the reverse side of the sheet is the right side of the vehicle body.

Overall Configuration of Tractor

As shown in FIG. 1, the travel vehicle body of the tractor includes an engine 1, a clutch unit 2, a transmission case 3, and a vehicle body frame 5. The clutch unit 2 is joined to a rear portion of the engine 1, and the transmission case 3 is joined to a rear portion of the clutch unit 2. The vehicle body frame 5 includes a front wheel support frame 4. The front wheel support frame 4 extends forward from a lower portion of the engine 1. A pair of left and right front wheels 6 are provided in a front portion of the vehicle body frame 5 so as to be drivable and steerable, and a pair of left and right rear wheels 7 are provided in a rear portion of the vehicle body frame 5 so as to be drivable. A prime mover unit 8 that includes the engine 1 is formed in a front portion of the travel vehicle body. A driving portion 11 is formed in a rear portion of the travel vehicle body, and a driver seat 9 and a steering wheel 10 are provided in the driving portion 11. The front wheels 6 are steered using the steering wheel 10. A cabin 12 that covers a riding space is provided in the driving portion 11. The rear portion of the vehicle body frame 5 is equipped with a link mechanism 13, and various types of work devices such as a rotary cultivator are coupled using the link mechanism 13 so as to be capable of lifting and lowering. A motive power take-off shaft 14 is provided at a rear portion of the transmission case 3. The motive power take-off shaft 14 is a so-called "PTO shaft", and transmits motive power from the engine 1 to a work device coupled to the link mechanism 13. The front wheels 6 and the rear wheels 7 correspond to a "travelling apparatus" in the present invention.

Configuration of Travel Power Transmission Apparatus

Figure 2:
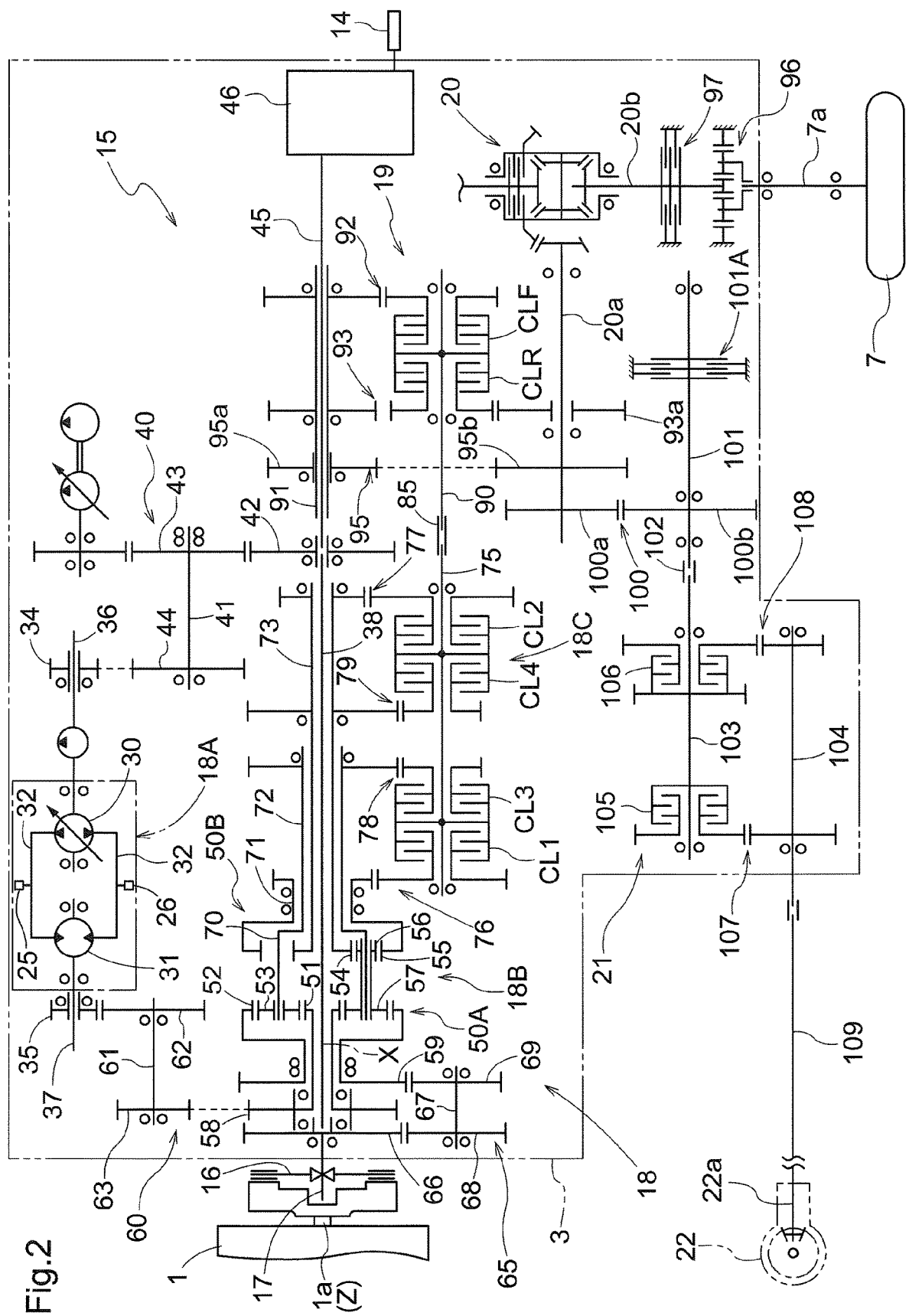
FIG. 2 is a line diagram showing a travel power transmission apparatus.

FIG. 2 schematically shows a travel power transmission apparatus 15 that transmits motive power of the engine 1 to the front wheels 6 and the rear wheels 7. The travel power transmission apparatus 15 is accommodated in the transmission case 3. Motive power of an output shaft 1a of the engine 1 is inputted from a damper disc 16 to an input shaft 17 of the transmission case 3. The travel power transmission apparatus 15 includes a hydromechanical speed changing apparatus 18, a forward/backward travel switch apparatus 19, a rear wheel differential mechanism 20, a front wheel power transmission mechanism 21, and a front wheel differential mechanism 22. The hydromechanical speed changing apparatus 18 subjects the motive power inputted to the input shaft 17 to speed changing. The forward/backward travel switch apparatus 19 converts the motive power outputted from the hydromechanical speed changing apparatus 18 to forward travel motive power or backward travel motive power. The rear wheel differential mechanism 20 transmits the forward travel motive power or the backward travel motive power outputted from the forward/backward travel switch apparatus 19, to the left and right rear wheels 7. The front wheel power transmission mechanism 21 outputs the forward travel motive power or the backward travel motive power outputted from the forward/backward travel switch apparatus 19, toward the front wheels 6. The front wheel differential mechanism 22 transmits the forward travel motive power or the backward travel motive power outputted from the front wheel power transmission mechanism 21, to the left and right front wheels 6. The hydromechanical speed changing apparatus 18 corresponds to a "speed changing apparatus" in the present invention. Accordingly, in the present embodiment, the front wheels 6 and the rear wheels 7, which define and function as the travelling apparatus, travel on the motive power received from the hydromechanical speed changing apparatus 18, which define and function as the speed changing apparatus.

Configuration of Speed Changing Apparatus

As shown in FIG. 2, the hydromechanical speed changing apparatus 18 includes a hydrostatic stepless speed changing portion 18A, a compound planetary power transmission portion 18B, and a staged power transmission portion 18C. Motive power of the engine 1 is inputted to the hydrostatic stepless speed changing portion 18A. Output of the hydrostatic stepless speed changing portion 18A and the motive power of the engine 1 are inputted to the compound planetary power transmission portion 18B. Output of the compound planetary power transmission portion 18B is divided into stages and outputted by the staged power transmission portion 18C.

When viewed in the front-rear direction, an output shaft 75 of the staged power transmission portion 18C and an input shaft 90 of the forward/backward travel switch apparatus 19 are located on one side in the lateral direction with respect to a shaft center X of sun gears 51 and 54 of the compound planetary power transmission portion 18B. Also, when viewed in the front-rear direction, a pump shaft 36 and a motor shaft 37 of a stepless output gear 35 of the hydrostatic stepless speed changing portion 18A are located on the other side in the lateral direction with respect to the shaft center X of the sun gears 51 and 54. The hydrostatic stepless speed changing portion 18A corresponds to a "hydrostatic stepless speed changing mechanism" in the present invention.

The hydrostatic stepless speed changing portion 18A is a hydrostatic stepless speed changing apparatus. The hydrostatic stepless speed changing portion 18A includes a variable-capacity axial-plunger hydraulic pump 30, a fixed-capacity axial-plunger hydraulic motor 31, and a pair of driving oil paths 32. The hydraulic pump 30 is driven by motive power transmitted from the engine 1. The hydraulic motor 31 is driven by hydraulic oil discharged from the hydraulic pump 30. The pair of driving oil paths 32 are a pair of hydraulic paths (an inlet path and a return path) through which the hydraulic oil circulates between the hydraulic pump 30 and the hydraulic motor 31. In other words, the hydraulic pump 30, the hydraulic motor 31, and the pair of driving oil paths 32 are provided in a closed circuit of the hydrostatic stepless speed changing portion 18A.

The hydrostatic stepless speed changing portion 18A includes a stepless input gear 34 and the stepless output gear 35. The stepless input gear 34 is provided in a rear portion of the hydrostatic stepless speed changing portion 18A so as to be rotatable. The stepless output gear 35 is provided in a front portion of the hydrostatic stepless speed changing portion 18A so as to be rotatable. The stepless input gear 34 is provided on the pump shaft 36 so as not to be rotatable freely relative to the pump shaft 36, and rotates together with the pump shaft 36. The stepless output gear 35 is provided on the motor shaft 37 so as not to be rotatable freely relative to the motor shaft 37, and rotates together with the motor shaft 37. Although details will be described later, a first pressure detector 25 and a second pressure detector 26 are respectively provided on the inlet path and the return path of the driving oil paths 32, and each of the first pressure detector 25 and the second pressure detector 26 detects a hydraulic pressure in the closed circuit of the hydrostatic stepless speed changing portion 18A.

A second motive power transmission mechanism 40 is provided, spanning between the stepless input gear 34 and a portion of a rotary shaft 38 that passes through a shaft center portion of the compound planetary power transmission portion 18B in the front-rear direction, the portion being located on the rearward of the compound planetary power transmission portion 18B. The rotary shaft 38 and the input shaft 17 of the hydromechanical speed changing apparatus 18 are engaged through spline engagement so as not to be rotatable freely relative to each other.

The second motive power transmission mechanism 40 includes a rotatable second relay shaft 41, a motive power take-out gear 42, a third relay gear 43, and a fourth relay gear 44. The second relay shaft 41 is arranged parallel to the pump shaft 36. The motive power take-out gear 42 provided on the rotary shaft 38 so as not to be rotatable freely relative to the rotary shaft 38. The third relay gear 43 is provided on a rear end portion of the second relay shaft 41 so as not to be rotatable freely relative to the second relay shaft 41, in a state of meshing with the motive power take-out gear 42. The fourth relay gear 44 is provided on a front end portion of the second relay shaft 41 so as not to be rotatable freely relative to the second relay shaft 41, in a state of meshing with the stepless input gear 34. The second motive power transmission mechanism 40 transmits motive power of the rotary shaft 38 to the stepless input gear 34. The rotary shaft 38 is interlockingly joined to the motive power take-off shaft 14 via a relay shaft 45 and a PTO speed changing apparatus 46, and transmits the motive power of the engine 1, which has been transmitted to the input shaft 17, to the motive power take-off shaft 14.

Transmission of motive power in the hydrostatic stepless speed changing portion 18A will be described. Motive power of the engine 1 is transmitted from the output shaft 1a to the rotary shaft 38 via the damper disc 16 and the input shaft 17. The motive power transmitted to the rotary shaft 38 is transmitted to the stepless input gear 34 by the second motive power transmission mechanism 40, and the motive power is subjected to stepless speed change and is changed to motive power in a forward rotation direction or a reverse rotation direction by the hydraulic pump 30 and the hydraulic motor 31. After being subjected to speed change, the motive power in the forward rotation direction or the motive power in the reverse rotation direction is outputted from the stepless output gear 35.

The compound planetary power transmission portion 18B includes the two sun gears 51 and 54, and is provided in a state where the shaft center X of the two sun gears 51 and 54 and a shaft center Z of the output shaft 1a of the engine 1 are aligned along a straight line. The compound planetary power transmission portion 18B includes planetary gear mechanisms 50A and 50B that are arranged in two trains in the front-rear direction. The planetary gear mechanism 50A of the first train includes the sun gear 51, an internal gear 52, and three planetary gears 53. The planetary gear mechanism 50B of the second train includes the sun gear 54, an internal gear 55, and three planetary gears 56. The planetary gear mechanism 50A of the first train includes three interlocking gears 57 that mesh with the three planetary gears 53, respectively. The three interlocking gears 57 are interlockingly joined respectively to the three planetary gears 56 of the planetary gear mechanism 50B of the second train. The interlocking gears 57 and the planetary gears 56 are interlockingly joined as a result of corresponding ones of the interlocking gears 57 and the planetary gears 56 being formed as a single piece.

A first planetary input gear 58 is provided in a front portion of the compound planetary power transmission portion 18B. The first planetary input gear 58 is interlockingly joined to the sun gear 51 of the planetary gear mechanism 50A of the first train so as not to be rotatable freely relative to the sun gear 51. The first planetary input gear 58 is interlockingly joined to the stepless output gear 35 of the hydrostatic stepless speed changing portion 18A by a motive power transmission mechanism 60. The motive power transmission mechanism 60 includes a rotatable relay shaft 61, a first relay gear 62, and a second relay gear 63. The relay shaft 61 is arranged parallel to the motor shaft 37 of the stepless output gear 35. The first relay gear 62 is provided on a rear end portion of the relay shaft 61 so as not to be rotatable freely relative to the relay shaft 61, in a state of meshing with the stepless output gear 35. The second relay gear 63 is provided on a front end portion of the relay shaft 61 so as not to be rotatable freely relative to the relay shaft 61, in a state of meshing with the first planetary input gear 58. Motive power of the stepless output gear 35 is transmitted to the first planetary input gear 58 by the motive power transmission mechanism 60, and is inputted from the first planetary input gear 58 to the sun gear 51.

A second planetary input gear 59 is provided in the front portion of the compound planetary power transmission portion 18B, and is interlockingly joined to the internal gear 52 of the planetary gear mechanism 50A of the first train so as not to be rotatable freely relative to the internal gear 52. The second planetary input gear 59 is interlockingly joined to the input shaft 17 by an input power transmission mechanism 65. The input power transmission mechanism 65 includes an input shaft gear 66, a fourth relay gear 68, and a fifth relay gear 69. The input shaft gear 66 is provided on the input shaft 17 so as not to be rotatable freely relative to the input shaft 17. The fourth relay gear 68 is provided on a front end portion of a third relay shaft 67 so as not to be rotatable freely relative to the third relay shaft 67, in a state of meshing with the input shaft gear 66. The fifth relay gear 69 is provided on a rear end portion of the third relay shaft 67 so as not to be rotatable freely relative to the third relay shaft 67, in a state of meshing with the second planetary input gear 59. Motive power of the engine 1 is transmitted from the output shaft 1a to the input shaft 17 via the damper disc 16, is transmitted to the second planetary input gear 59 by the input power transmission mechanism 65, and is inputted from the second planetary input gear 59 to the internal gear 52.

A first output shaft 71, a second output shaft 72, and a third output shaft 73 are provided in a rear portion of the compound planetary power transmission portion 18B so as not to be rotatable freely relative to each other. The first output shaft 71, the second output shaft 72, and the third output shaft 73 are configured as triple shafts. The first output shaft 71 is interlockingly joined to the internal gear 55 of the planetary gear mechanism 50B of the second train, and transmits motive power to a first gear interlocking mechanism 76. The second output shaft 72 is interlockingly joined to a carrier 70, and transmits motive power to a third gear interlocking mechanism 78. The carrier 70 is configured to support the planetary gears 53 of the planetary gear mechanism 50A of the first train and the planetary gears 56 of the planetary gear mechanism 50B of the second train. The third output shaft 73 is interlockingly joined to the sun gear 54 of the planetary gear mechanism 50B of the second train, and transmits motive power to a second gear interlocking mechanism 77 and a fourth gear interlocking mechanism 79.

The hydrostatic stepless speed changing portion 18A outputs motive power in the forward rotation direction or the reverse rotation direction from the stepless output gear 35. The motive power outputted from the hydrostatic stepless speed changing portion 18A is inputted to the sun gear 51 of the planetary gear mechanism 50A of the first train by the motive power transmission mechanism 60. Motive power transmitted from the engine 1 is inputted to the internal gear 52 of the planetary gear mechanism 50A of the first train by the input power transmission mechanism 65. In the compound planetary power transmission portion 18B, the motive power of the hydrostatic stepless speed changing portion 18A and the motive power of the engine 1 are composited by the planetary gear mechanisms 50A and 50B arranged in the two trains, and the composited motive power is outputted from the first output shaft 71, the second output shaft 72, and the third output shaft 73.

The staged power transmission portion 18C includes a first clutch CL1, a second clutch CL2, a third clutch CL3, and a fourth clutch CL4. The first to fourth clutches CL1 to CL4 are constituted by hydraulic multi-plate clutches. The output shaft 75 is interlockingly joined to output-side rotary members of the first to fourth clutches CL1 to CL4 so as not to be rotatable freely relative to the output-side rotary members.

The first gear interlocking mechanism 76 is provided, spanning between an input-side rotary member of the first clutch CL1 and the first output shaft 71 of the compound planetary power transmission portion 18B, and sets a first range. The second gear interlocking mechanism 77 is provided, spanning between an input-side rotary member of the second clutch CL2 and the third output shaft 73 of the compound planetary power transmission portion 18B, and sets a second range. The third gear interlocking mechanism 78 is provided, spanning between an input-side rotary member of the third clutch CL3 and the second output shaft 72 of the compound planetary power transmission portion 18B, and sets a third range. The fourth gear interlocking mechanism 79 is provided, spanning between an input-side rotary member of the fourth clutch CL4 and the third output shaft 73 of the compound planetary power transmission portion 18B, and sets a fourth range.

Figure 3:
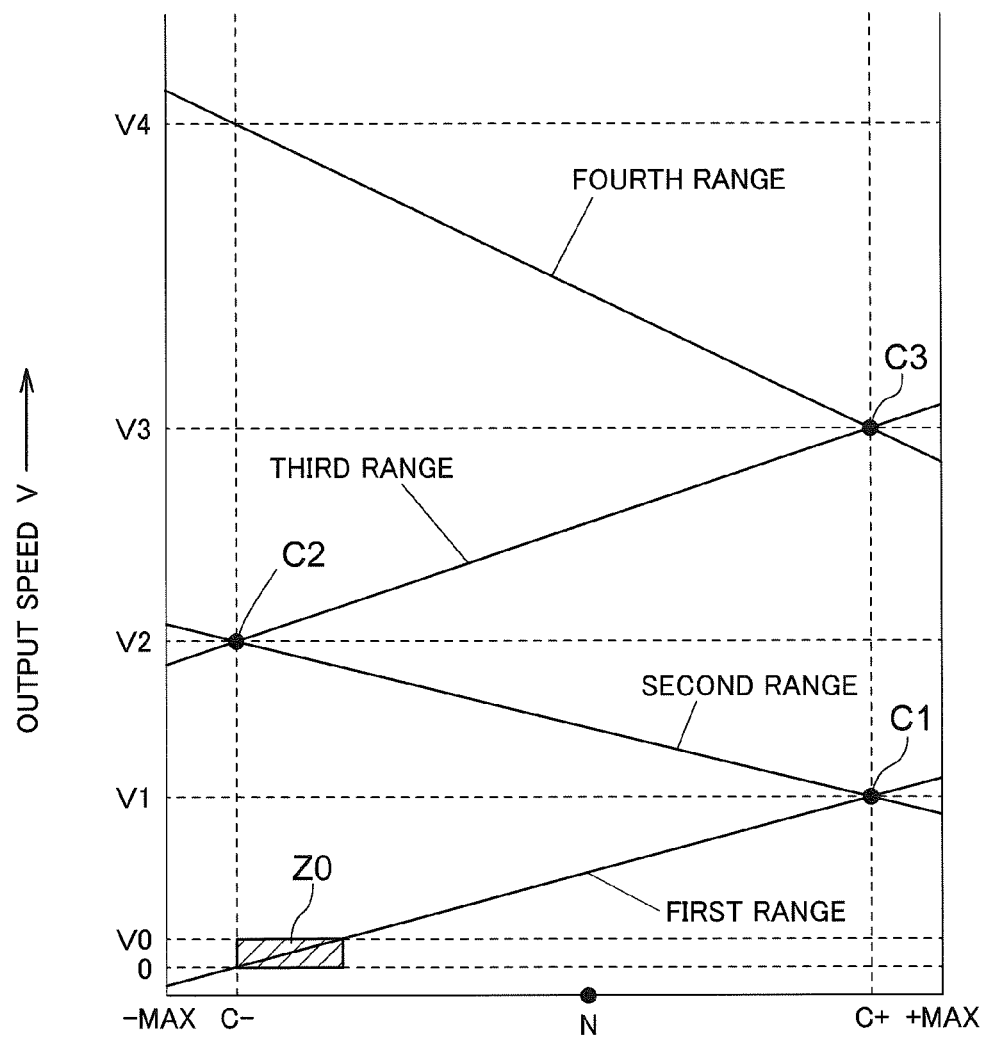
FIG. 3 is an illustrative diagram showing a relationship between a speed change state of a stepless speed changing unit, a speed range, and an output speed of an output shaft.

FIG. 3 is a graph diagram showing a relationship between a speed change state of the hydrostatic stepless speed changing portion 18A, the first to fourth ranges, and an output speed V of the output shaft 75. The vertical axis in FIG. 3 indicates the output speed V of the output shaft 75. The horizontal axis in FIG. 3 indicates the speed change state of the hydrostatic stepless speed changing portion 18A. "N" indicates a neutral state. "+MAX" indicates a maximum speed state in a case where the output direction of the hydrostatic stepless speed changing portion 18A is the forward rotation direction. "−MAX" indicates a maximum speed state in a case where the output direction of the hydrostatic stepless speed changing portion 18A is the reverse rotation direction. Stepless speed change control to the hydrostatic stepless speed changing portion 18A is performed by changing the swashplate angle of the hydrostatic stepless speed changing portion 18A between "C+" and "C−". "C+" and "C−" are set between "+MAX" and "−MAX".

On the output speed V axis (vertical axis) of FIG. 3, the region between 0 and V1 is the first range, which is the speed range of a case where the first clutch CL1 is in a motive power transmitting state. The region between V1 and V2 is the second range, which is the speed range of a case where the second clutch CL2 is in the motive power transmitting state. The region between V2 and V3 is the third range, which is the speed range of a case where the third clutch CL3 is in the motive power transmitting state. The region between V3 and V4 is the fourth range, which is the speed range of a case where the fourth clutch CL4 is in the motive power transmitting state.

An intersection C1 of the first range and the second range is shown in FIG. 3, and the output speed V at the intersection C1 is V1. At the intersection C1, the first clutch CL1 or the second clutch CL2 is set to the motive power transmitting state, and the output speed V is V1 irrespective of which of the first clutch CL1 and the second clutch CL2 is in the motive power transmitting state. An intersection C2 of the second range and the third range is shown, and the output speed V at the intersection C2 is V2. At the intersection C2, the second clutch CL2 or the third clutch CL3 is set to the motive power transmitting state, and the output speed V is V2 irrespective of which of the second clutch CL2 and the third clutch CL3 is in the motive power transmitting state. An intersection C3 of the third range and the fourth range is shown, and the output speed V at the intersection C3 is V3. At the intersection C3, the third clutch CL3 or the fourth clutch CL4 is set to the motive power transmitting state, and the output speed V is V3 irrespective of which of the third clutch CL3 and the fourth clutch CL4 is in the motive power transmitting state. The intersection C1 is an intersection of V1 and C+. The intersection C2 is an intersection of V2 and C−. The intersection C3 is an intersection of V3 and C+.

In a region indicated by Z0in the first range shown in FIG. 3, the rotation speed of the hydrostatic stepless speed changing portion 18A and the rotation speed of the engine 1 substantially offset each other, and the rotation speed of motive power outputted from the first output shaft 71 is approximately zero. When the first clutch CL1 is controlled to enter the motive power transmitting state, the first clutch CL1 is capable of transmitting motive power from the first output shaft 71 to the output shaft 75. The output speed V of the output shaft 75 steplessly increases from zero to V1 in the first range as a result of speed change control being performed on a swashplate of the hydrostatic stepless speed changing portion 18A from a region near the maximum speed in the reverse rotation direction (near −MAX) toward a region near the maximum speed in the forward rotation direction (near +MAX).

In a state where the output speed V of the output shaft 75 is V1, when the first clutch CL1 is switched to a motive power cut-off state and the second clutch CL2 is switched to the motive power transmitting state, the speed range shifts from the first range to the second range. When switching from the first clutch CL1 to the second clutch CL2 is performed at the intersection C1, the output speed V is kept at V1. Then, the output speed V of the output shaft 75 steplessly increases from V1 to V2 in the second range as a result of speed change control being performed on the swashplate of the hydrostatic stepless speed changing portion 18A from a region near the maximum speed in the forward rotation direction (near +MAX) toward a region near the maximum speed in the reverse rotation direction (near −MAX).

In a state where the output speed V of the output shaft 75 is V2, when the second clutch CL2 is switched to the motive power cut-off state and the third clutch CL3 is switched to the motive power transmitting state, the speed range shifts from the second range to the third range. When switching from the second clutch CL2 to the third clutch CL3 is performed at the intersection C2, the output speed V is kept at V2. Then, the output speed V of the output shaft 75 steplessly increases from V2 to V3 in the third range as a result of speed change control being performed on the swashplate of the hydrostatic stepless speed changing portion 18A from a region near the maximum speed in the reverse rotation direction (near −MAX) toward a region near the maximum speed in the forward rotation direction (near +MAX).

In a state where the output speed V of the output shaft 75 is V3, when the third clutch CL3 is switched to the motive power cut-off state and the fourth clutch CL4 is switched to the motive power transmitting state, the speed range shifts from the third range to the fourth range. When switching from the third clutch CL3 to the fourth clutch CL4 is performed at the intersection C3, the output speed V is kept at V3. Then, the output speed V of the output shaft 75 steplessly increases from V3 to V4 in the fourth range as a result of speed change control being performed on the swashplate of the hydrostatic stepless speed changing portion 18A from a region near the maximum speed in the forward rotation direction (near +MAX) toward a region near the maximum speed in the reverse rotation direction (near −MAX).

In a case where the output speed V of the output shaft 75 is reduced from V4 to zero, speed change control is performed on the swashplate of the hydrostatic stepless speed changing portion 18A in the direction reverse to the direction of the case where the output speed V is increased, and the clutches are switched to the motive power transmitting state in the order of the fourth clutch CL4, the third clutch CL3, the second clutch CL2, and the first clutch CL1. As a result, the output speed V of the output shaft 75 steplessly decreases in the order of the fourth range, the third range, the second range, and the first range.

Motive Power after Speed Change

As shown in FIG. 2, the output shaft 75 and the input shaft 90 are interlockingly joined via a coupling member 85 so as not to be rotatable freely relative to each other. Motive power outputted from the staged power transmission portion 18C is inputted from the output shaft 75 to the input shaft 90, is converted to forward travel motive power or backward travel motive power by the forward/backward travel switch apparatus 19, and is transmitted to an output shaft 91. The output shaft 91 is arranged parallel to the input shaft 90, and is constituted by a tube shaft fitted on the relay shaft 45 from outer side so as not to be rotatable freely relative to the relay shaft 45. A shaft center of the output shaft 91 coincides with the shaft center of the sun gears 51 and 54 of the compound planetary power transmission portion 18B.

The forward/backward travel switch apparatus 19 includes a forward clutch CLF and a backward clutch CLR. An input-side rotary member of the forward clutch CLF and an input-side rotary member of the backward clutch CLR are joined to the input shaft 90 so as not to be rotatable freely relative to the input shaft 90. A forward travel gear mechanism 92 is provided, spanning between an output-side rotary member of the forward clutch CLF and the output shaft 91. A backward travel gear mechanism 93 is provided, spanning between an output-side rotary member of the backward clutch CLR and the output shaft 91. A reverse rotation gear 93a of the backward travel gear mechanism 93 is supported by an input shaft 20a of the rear wheel differential mechanism 20 so as not to be rotatable freely relative to the input shaft 20a. A gear interlocking mechanism 95 is provided, spanning between a front portion of the output shaft 91 of the forward/backward travel switch apparatus 19 and a front portion of the input shaft 20a of the rear wheel differential mechanism 20.

When the forward clutch CLF is in the motive power transmitting state and the backward clutch CLR is in the motive power cut-off state, motive power inputted from the output shaft 75 to the input shaft 90 is transmitted as forward travel motive power to the output shaft 91 via the forward clutch CLF and the forward travel gear mechanism 92. When the forward clutch CLF is in the motive power cut-off state and the backward clutch CLR is in the motive power transmitting state, motive power inputted from the output shaft 75 to the input shaft 90 is transmitted as backward travel motive power in the rotation direction reverse to the rotation direction of the forward travel motive power, to the output shaft 91 via the backward clutch CLR and the backward travel gear mechanism 93.

Forward travel motive power or backward travel motive power outputted from the output shaft 91 by the forward/backward travel switch apparatus 19 is transmitted to the input shaft 20a of the rear wheel differential mechanism 20 by the gear interlocking mechanism 95, and is transmitted to the left and right rear wheels 7 by the rear wheel differential mechanism 20. The motive power is transmitted from the rear wheel differential mechanism 20 to the left and right rear wheels 7 via a planetary gear final deceleration mechanism 96 provided between an output shaft 20b of the rear wheel differential mechanism 20 and a rear wheel shaft 7a.

A brake 97 for braking the rear wheels 7 is provided on the output shaft 20b of the rear wheel differential mechanism 20. The brake 97 corresponds to a "braking apparatus" in the present embodiment.

The front wheel power transmission mechanism 21 includes an input shaft 103 and an output shaft 104. The input shaft 103 is interlockingly joined to a front portion of the input shaft 20a of the rear wheel differential mechanism 20 via a second gear interlocking mechanism 100, a relay shaft 101, and a coupling member 102. The output shaft 104 is arranged parallel to the input shaft 103. An input-side rotary member of an equal speed clutch 105 and an input-side rotary member of an acceleration clutch 106 are joined to the input shaft 103 so as not to be rotatable freely relative to the input shaft 103. An equal speed gear mechanism 107 that transmits motive power to the output shaft 104 at a rotation speed substantially equal to the rotation speed of the input shaft 103 is provided, spanning between an output-side rotary member of the equal speed clutch 105 and the output shaft 104. An acceleration gear mechanism 108 that transmits motive power to the output shaft 104 while increasing the rotation speed as compared to the rotation speed of the input shaft 103 is provided, spanning between an output-side rotary member of the acceleration clutch 106 and the output shaft 104. The output shaft 104 is interlockingly joined to an input shaft 22a of the front wheel differential mechanism 22 via a rotary shaft 109, and outputs the motive power to the left and right front wheels 6. It should be noted that a parking brake 101A is attached to the relay shaft 101.

When the equal speed clutch 105 is in the motive power transmitting state and the acceleration clutch 106 is in the motive power cut-off state, the front wheels 6 and the rear wheels 7 are driven in a state where an average circumferential speed of the left and right front wheels 6 is substantially equal to an average circumferential speed of the left and right rear wheels 7. When the equal speed clutch 105 is in the motive power cut-off state and the acceleration clutch 106 is in the motive power transmitting state, the front wheels 6 and the rear wheels 7 are driven in a state where the average circumferential speed of the left and right front wheels 6 is higher than the average circumferential speed of the left and right rear wheels 7. When both of the equal speed clutch 105 and the acceleration clutch 106 are in the motive power cut-off state, transmission of motive power from the input shaft 103 to the output shaft 104 is stopped, and output to the front wheels 6 is stopped. In this case, the left and right front wheels 6 are not driven, and only the left and right rear wheels 7 are driven.

Swashplate Angle Control Module

As described above, when the output speed V of the output shaft 75 is reduced from V4 to zero, the output speed V of the output shaft 75 steplessly decreases in the order of the fourth range, the third range, the second range, and the first range. If a brake operation is performed by an operator, deceleration control to the hydrostatic stepless speed changing portion 18A is performed while a braking action is performed by brakes 97 respectively provided on the pair of left and right rear wheels 7. However, if the braking action of the brakes 97 is strong (so-called sudden braking), there is a risk that a braking force of the brakes 97 will act on the output shaft 75 at a speed faster than an operation speed of the swashplate of the hydrostatic stepless speed changing portion 18A, and the output shaft 20b and the output shaft 75 will be restrained before operation of the swashplate completes. At this time, there is a risk that the hydraulic pressure in the driving oil paths 32 will become excessively high, and a relief valve provided on the driving oil paths 32 will operate or the temperature of the hydraulic oil in the driving oil paths 32 will be higher than an appropriate temperature. In such a case, there is a risk that the efficiency of motive power transmission performed by the hydrostatic stepless speed changing portion 18A will be affected. Control systems for avoiding these problems will be described based on FIGS. 4 and 5.

Figure 4:
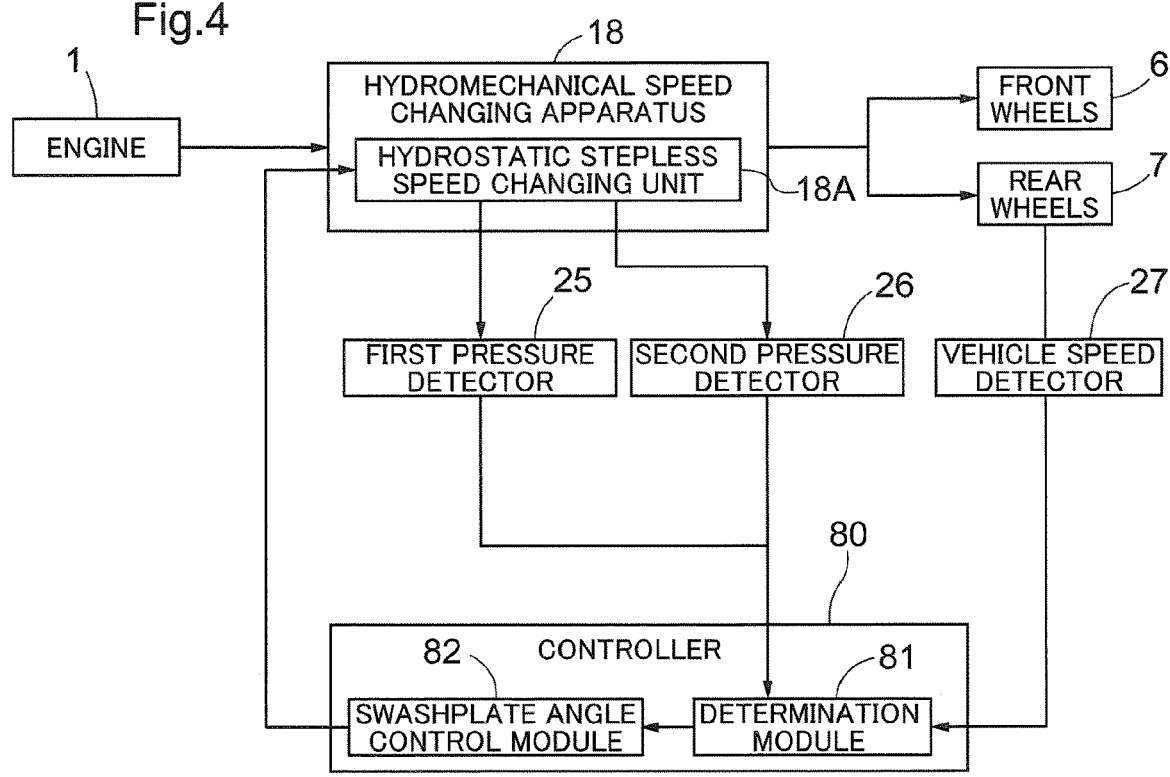
FIG. 4 is a block diagram showing swashplate angle change control.

As shown in FIG. 4, the first pressure detector 25 and the second pressure detector 26 are respectively provided on the inlet path and the return path of the driving oil paths 32, and detect the pressure of the hydraulic oil circulating through the driving oil paths 32. A controller 80 shown in FIG. 4 is constituted by a microcomputer, and includes a determination module 81 and a swashplate angle control module 82. Detection signals of the first pressure detector 25, the second pressure detector 26, and a vehicle speed detector 27 are transmitted to the controller 80. The vehicle speed detector 27 corresponds to a "speed detector" in the present invention, and is configured to detect the speed of the rear wheels 7 based on the rotation speed of the input shaft 20a or the output shaft 20b, for example. Also, the vehicle speed detector 27 is capable of detecting the output speed V of the output shaft 75 based on the rotation speed of the input shaft 20a or the output shaft 20b.

The determination module 81 determines whether or not the swashplate angle of the hydrostatic stepless speed changing portion 18A is an angle suitable for stopping the tractor, based on a speed detected by the vehicle speed detector 27 and a hydraulic pressure detected by the first pressure detector 25 and the second pressure detector 26. The swashplate angle suitable for stopping the tractor is an angle at which the rotation speed of motive power outputted from the output shaft 75 is not greater than a predetermined rotation speed. That is, the determination module 81 determines whether or not the swashplate angle is an angle at which the rotation speed of the motive power outputted from the hydromechanical speed changing apparatus 18 is not greater than the predetermined rotation speed. Based on a result of the determination by the determination module 81, the swashplate angle control module 82 performs control for changing the swashplate angle of the hydrostatic stepless speed changing portion 18A.

Figure 5:
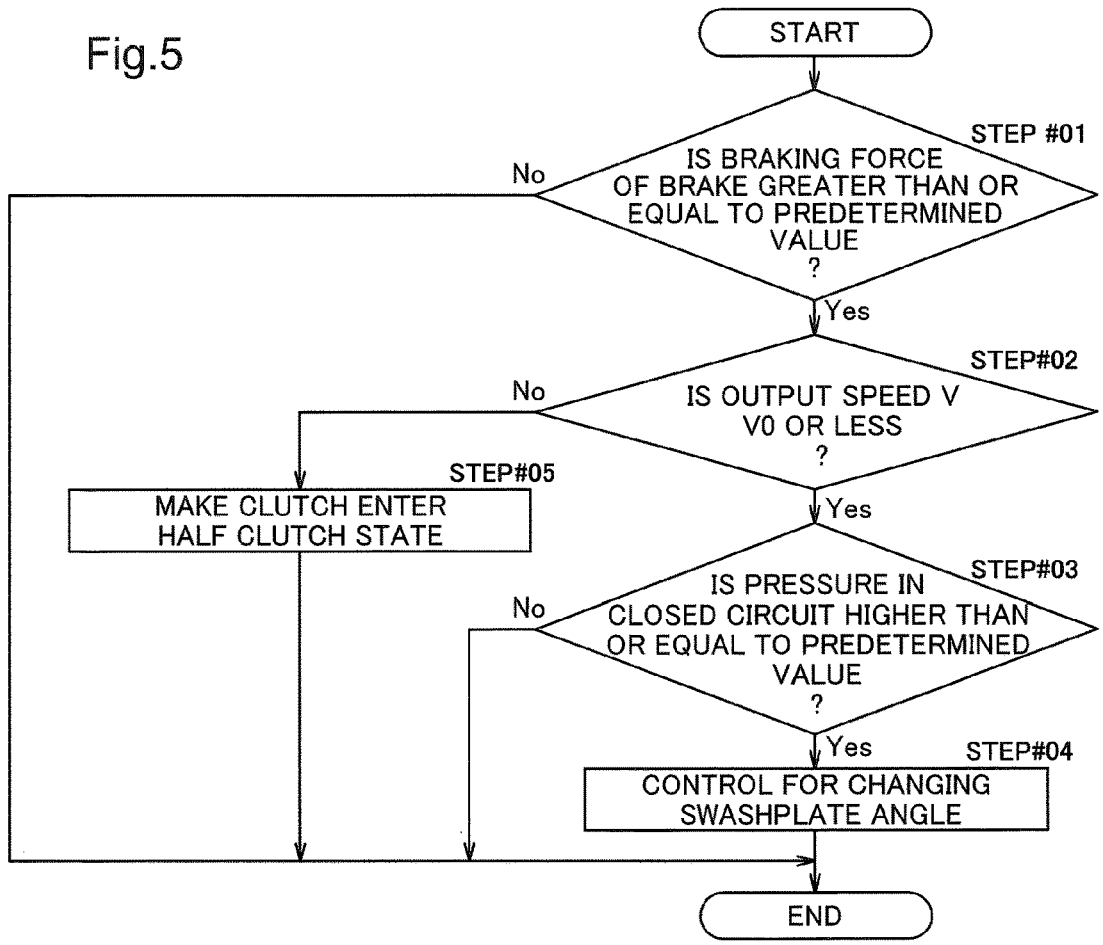
FIG. 5 is a flowchart showing a flow of the swashplate angle change control.

FIG. 5 shows an example of processing performed by the determination module 81. The swashplate angle control module 82 performs control for changing the swashplate angle when the rear wheels 7 are being braked by the brakes 97 based on following steps. At first, the determination module 81 determines whether or not the braking force of the brakes 97 described above is greater than or equal to a predetermined value (step #01). The braking force of the brakes 97 may be calculated based on an operation amount of a brake pedal or a detection value of a three-dimensional acceleration sensor, for example. When the braking force of the brakes 97 is less than the predetermined value (step #01: No), the determination module 81 determines that the braking force of the brakes 97 is moderate. When the braking force of the brakes 97 is moderate, the operation speed of the swashplate of the hydrostatic stepless speed changing portion 18A is sufficient to catch up with a reduction in the rotation speed of the output shaft 20b and the output shaft 75 due to the braking action of the brakes 97. Therefore, the determination module 81 does not perform determination processing, and the swashplate angle control module 82 does not perform control for changing the swashplate angle.

When the braking force of the brakes 97 is greater than or equal to the predetermined value (step #01: Yes), the determination module 81 determines that sudden braking is applied. Then, the determination module 81 determines whether or not the output speed V of the output shaft 75 is V0 or less (step #02). V0 is smaller than V1, and is a speed within the first range shown in FIG. 3. When the output speed V is more than V0 (step #02: No), the controller 80 controls the forward clutch CLF such that the forward clutch CLF enters a half clutch state, for example (step #05). As a result of the clutch entering the half clutch state, an increase in the pressure of the hydraulic oil circulating through the driving oil paths 32 is suppressed and the engine 1 is prevented from stalling, even when rapid deceleration is performed by the brakes 97.

When the output speed V is V0 or less (step #02: Yes), the determination module 81 determines whether or not the hydraulic pressure in the driving oil paths 32, which is the closed circuit, is higher than or equal to a predetermined value (step #03). When the hydraulic pressure in the driving oil paths 32 is higher than or equal to the predetermined value (step #03: Yes), the determination module 81 determines that an excessive load is applied to the hydrostatic stepless speed changing portion 18A in a stopped state of the tractor. At this time, the swashplate angle control module 82 controls and operates the swashplate of the hydrostatic stepless speed changing portion 18A to the region indicated by Z0 shown in FIG. 3 so that the rotation speed of the hydrostatic stepless speed changing portion 18A and the rotation speed of the engine 1 will offset each other. As a result, composite motive power of the engine 1 and the hydrostatic stepless speed changing portion 18A becomes approximately zero, and an excessive increase in the pressure of the hydraulic oil in the driving oil paths 32 is suppressed. That is, the swashplate angle control module 82 performs control for changing the swashplate angle of the hydrostatic stepless speed changing portion 18A, when the output speed V is no greater than a predetermined value and the hydraulic pressure in the driving oil paths 32, which is the closed circuit, is higher than or equal to a predetermined value.

When the pressure in the driving oil paths 32 is lower than the predetermined value (step #03: No), the determination processing performed by the determination module 81 ends, and the swashplate angle control module 82 does not perform control for changing the swashplate angle.

Additional Preferred Embodiments

The preferred embodiments of the present invention is not limited to the configuration described as examples in the above embodiments. The following describes other representative preferred embodiments of the present invention.

(1) The flowchart shown in FIG. 5 may start from step #02, with control performed in step #01 omitted.

(2) V0 shown in FIG. 3 may be zero. In this case, control for changing the swashplate angle may be performed by the swashplate angle control module 82 after the tractor has stopped (including the moment at which the tractor stops).

(3) In the preferred embodiment described above, the speed changing apparatus is the hydromechanical speed changing apparatus 18 that includes the planetary gear mechanisms 50A and 50B on the output side of the hydrostatic stepless speed changing portion 18A, but the speed changing apparatus may be configured to include only the hydrostatic stepless speed changing portion 18A.

(4) In the preferred embodiment described above, the first pressure detector 25 and the second pressure detector 26 are respectively provided on the inlet path and the return path of the driving oil paths 32, but there is no limitation to this embodiment. For example, a configuration is also possible in which at least one of the pair of driving oil paths 32 is provided with a pressure detector.

(5) In the preferred embodiment described above, the front wheels 6 and the rear wheels 7 are provided as the travelling apparatus, but the travelling apparatus may be a crawler-type travelling apparatus.

(6) In the preferred embodiment described above, when the hydraulic pressure in the driving oil paths 32 is higher than or equal to the predetermined value, the swashplate angle control module 82 causes the swashplate of the hydrostatic stepless speed changing portion 18A to operate to the range indicated by Z0 shown in FIG. 3, based on the result of the determination by the determination module 81. At this time, the swashplate of the hydrostatic stepless speed changing portion 18A may operate from an upper right side (intersection C1 side) region of the first range shown in FIG. 3 to the region indicated by Z0, or from a lower left side (−MAX side) region of the first range shown in FIG. 3 to the region indicated by Z0. A state where the swashplate of the hydrostatic stepless speed changing portion 18A is in the lower left side (−MAX side) region of the first range is a state where the output speed V is lower than or equal to zero and a rotational force in a direction reverse to a regular rotation direction acts on the output shaft 75, for example. In such a case as well, an excessive hydraulic pressure may be applied to the hydrostatic stepless speed changing portion 18A, and accordingly, the determination module 81 determines whether or not the hydraulic pressure in the driving oil paths 32 is higher than or equal to the predetermined value, based on step #03 shown in FIG. 5. Then, based on a result of the determination by the determination module 81, the swashplate angle control module 82 causes the swashplate of the hydrostatic stepless speed changing portion 18A to operate to the region indicated by Z0 shown in FIG. 3.

Preferred embodiments of the present invention are applicable to a work vehicle that includes a speed changing apparatus including a hydrostatic stepless speed changing mechanism.

While preferred embodiments of the present invention have been described above, it is to be understood that variations and modifications will be apparent to those skilled in the art without departing from the scope and spirit of the present invention. The scope of the present invention, therefore, is to be determined solely by the following claims

What is claimed is:

1. A work vehicle comprising:
    an engine;
    a speed changing apparatus including a hydrostatic stepless speed changing mechanism and configured to subject motive power from the engine to speed changing and output the motive power;
    a travelling apparatus configured to travel on the motive power received from the speed changing apparatus;
    a speed detector configured to detect a speed of the travelling apparatus;
    a pressure detector configured to detect a hydraulic pressure in a closed circuit of the hydrostatic stepless speed changing mechanism; and
    a controller configured or programmed to:
        determine, by a determination module and based on the speed and the hydraulic pressure, whether the hydrostatic stepless speed changing mechanism has a swashplate angle such that the rotation speed outputted from the hydrostatic stepless speed changing mechanism and the rotation speed of the engine being offset each other; and change the swashplate angle by an angle control module based on a result of the determination by the determination module.

2. The work vehicle according to claim 1, wherein
the controller is configured or programmed to determine, by the determination module, whether the swashplate angle is an angle at which a rotation speed of the motive power outputted from the speed changing apparatus is not greater than a predetermined rotation speed.

3. The work vehicle according to claim 1, wherein
the speed changing apparatus is a hydromechanical speed changing apparatus including a planetary gear mechanism on an output side of the hydrostatic stepless speed changing mechanism.

4. The work vehicle according to claim 1, wherein
the closed circuit of the hydrostatic stepless speed changing mechanism includes:
   a hydraulic pump drivable by the motive power from the engine;
   a hydraulic motor drivable by hydraulic oil from the hydraulic pump; and
   a hydraulic path through which the hydraulic oil circulates between the hydraulic pump and the hydraulic motor, and
the pressure detector is disposed on the hydraulic path.

5. A work vehicle comprising:
an engine;
a speed changing apparatus including a hydrostatic stepless speed changing mechanism and configured to subject motive power from the engine to speed changing and output the motive power;
a travelling apparatus configured to travel on the motive power received from the speed changing apparatus;
a speed detector configured to detect a speed of the travelling apparatus;
a pressure detector configured to detect a hydraulic pressure in a closed circuit of the hydrostatic stepless speed changing mechanism; and
a controller configured or programmed to:
   determine, by a determination module and based on the speed and the hydraulic pressure, whether the hydrostatic stepless speed changing mechanism has a swashplate angle suitable for stopping the work vehicle; and
   change the swashplate angle by an angle control module based on a result of the determination by the determination module
in a case where the speed is not greater than a predetermined value and the hydraulic pressure is higher than or equal to a predetermined value.

6. A work vehicle comprising:
an engine;
a speed changing apparatus including a hydrostatic stepless speed changing mechanism and configured to subject motive power from the engine to speed changing and output the motive power;
a travelling apparatus configured to travel on the motive power received from the speed changing apparatus;
a speed detector configured to detect a speed of the travelling apparatus;
a pressure detector configured to detect a hydraulic pressure in a closed circuit of the hydrostatic stepless speed changing mechanism;
a braking apparatus configured to brake the travelling apparatus; and
a controller configured or programmed to:
   determine, by a determination module and based on the speed and the hydraulic pressure, whether the hydrostatic stepless speed changing mechanism has a swashplate angle suitable for stopping the work vehicle; and
   change the swashplate angle by an angle control module based on a result of the determination by the determination module
when the travelling apparatus is being braked.

* * * * *